Inventor
George G. Howard
By Mawhinney & Mawhinney
Attorneys

UNITED STATES PATENT OFFICE 2,142,752

CLINCHER HOSE COUPLING

George G. Howard, Waterbury, Conn., assignor to Scovill Manufacturing Company, Waterbury, Conn., a corporation of Connecticut Application April 5, 1938, Serial No. 200,266

1 Claim. (Cl. 285—84)

The present invention relates to hose couplings wherein the end of a hose if forced over upon a nipple, and may be secured thereon by bendable fingers, or other suitable means, clamping or reducing the hose end on the nipple to secure the coupling thereto.

In couplings of the present day known and used type the nipples thereof are provided with outwardly tapering beads with outwardly facing abrupt edges which catch against the extremity of the hose and render it difficult to work and expand the hose over the bead and nipple and offering but little resistance to the pulling of the hose from the nipple after the hose has been forced thereover.

To overcome these disadvantages is an object of this invention. The present invention provides, at the extremity of the nipple, a bead which presents a rounded or cam edge for the nipple to facilitate the expansion and sliding of the hose end over upon the nipple, and an abrupt inwardly facing shoulder at the extremity of the nipple which catches and binds the hose end when contracted on the nipple to offer considerable resistance to pulling off of the hose from the nipple, particularly when the hose end is reduced or clamped about the nipple inwardly of the shoulder.

Another object of the invention is to provide a nipple of improved construction which has its free edge overturned outwardly and backwardly into semi-bead form with a rounded smooth outer surface for engagement within the end of a hose to facilitate the expansion of the hose and the passage of the hose over the nipple, and with a biting free edge facing backwardly for biting engagement into the inner wall of the hose end to hold the latter from pulling off of the nipple.

A further object of the invention is to provide, in a hose coupling, a nipple with a rounded outer faced and inwardly shouldered bead so located relative to the clincher fingers or other clamping means of the coupling that the bead is outwardly of the end of the clamping means, and wherein the nipple is sufficiently reduced behind the bead to admit the contraction of the hose end behind the retaining shoulder of the bead.

Another object is to provide a coupling embodying the above characteristics without additional parts, as sleeves, rings and the like, and which accomplishes the new results by the particular location and construction of a bead embodied in the construction of the nipple itself for acting upon the inner wall of a hose end. Thus, the conventional type of hose coupling may be used, the improvements being only in the structure of the nipple and the other parts remaining the same as heretofore.

Another object of the invention is to provide a coupling nipple for engagement within the end of a hose and which has the combined expanding and retaining bead, the shoulder of which may be sufficiently rounded and smooth to prevent cutting and injury to the hose end but which at the same time presents a sufficient abutment for resisting the pulling of the hose off of the nipple under ordinary strain.

It is an important feature of this invention to dispose the backwardly outturned bead at the extremity of the insertable nipple to not only cam and expand the inner wall of the hose for passage over the bead, but also to provide a substantial length of the nipple inwardly of the bead to accommodate a sufficient length of the hose for contraction and compression about and against the nipple inwardly of the bead to securely hold the hose and prevent its pulling away from the coupling. In embodying the features of this invention in the present types of hose couplings, it is essential to maintain the structure small, short and with no additional parts, and wherein the same may be manufactured without any appreciable cost and without any additional steps in the method of manufacture so as to readily substitute the improved coupling for the present types now widely known and used.

With the foregoing and other objects in view, the invention will be more fully described hereinafter, and will be more particularly pointed out in the claim appended hereto.

In the drawing, wherein like symbols refer to like or corresponding parts throughout the several views.

3, but with a modified form of hose supporting nipple, and

Figure 6:
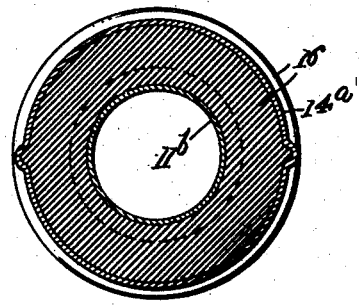

Figure 6 is a transverse section taken through the same.

Figure 1:
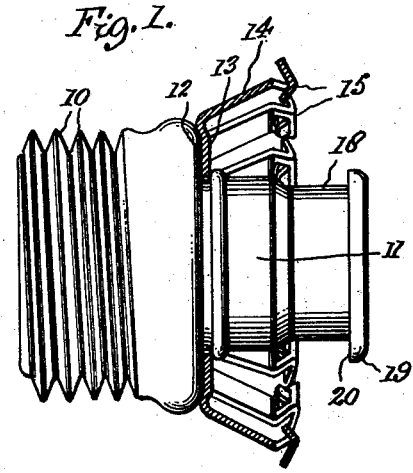
Figure 1 is a side elevation, partly in section, of a clincher hose coupling of the type having bendable clincher fingers, showing the nipple thereof constructed according to the present invention.
Figure 2:
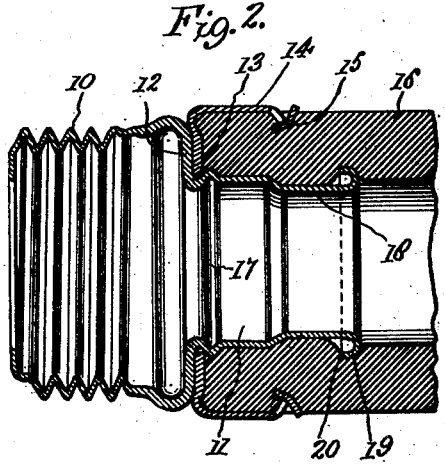
Figure 2 is a longitudinal section taken through the coupling, having the end of a hose secured thereto.

Referring now to the drawing, and first to Figures 1 and 2, the coupling is of the clincher finger type as disclosed in the co-pending application of Emerson H. Thompkins filed August 4, 1937, Serial No. 157,432.

The body of the coupling is made of sheet metal with an externally threaded plug portion 10 at one end and a reduced nipple 11 at its other end providing an intermediate forwardly facing shoulder 12. Surrounding the nipple 11 and seated against the shoulder 12 is a disc 13 carrying a plurality of clincher fingers 14 which are bendable at their juncture with the disc 13 and initially flare outwardly at an angle about the nipple 11. These fingers 14 are crimped or otherwise suitably formed with gripping portions 15 at their outer ends adapted to be forced into the outer surface portion of a hose 16, as shown in Figure 2, when the fingers 14 are bent or forced inwardly toward the hose after the latter has been placed over the nipple 11. The fingers 14 are proportioned relative to the nipple 11 so that when the fingers are bent inwardly into engagement with the hose the clamping portions 15 of the fingers are spaced inwardly from the nipple so as to pinch or compress a portion of the hose between the fingers and the outer end of the nipple.

The disc 14 may be held against the shoulder 12 in any suitable manner and in the present instance the base of the nipple 11 is provided with an outwardly pressed bead 17 which is spaced from the shoulder 12 a distance equal substantially to the thickness of the disc 13 and which engages the outer side of the disc to hold it against the shoulder and on the nipple. In the construction of the nipple 11 shown in Figures 1 and 2 the outer end portion of the nipple is reduced or stepped inwardly to provide a reduced neck portion 18 immediately adjacent the extremity of the nipple, and the end of the nipple is overturned outwardly and backwardly to provide an end bead 19 which terminates in a rearwardly facing abrupt shoulder 20 which provides at the outer margin of the shoulder a biting edge adapted to take into the inner wall of the hose 16, as shown in Figure 2, for frictionally and effectively holding the hose from pulling out from the nipple. The outer surface of the bead 19 presents a cam face which constitutes the extremity of the nipple and this cam face is annular and is rounded outwardly from the wall of the nipple so as to work into the extremity of the hose 16 as the latter is forced over the nipple 11 by pressure and aided by a slight twisting action. The cam face of the bead 19 thus facilitates the expansion of the hose over the nipple and renders it comparatively easy for fitting the hose upon the nipple without damage to the free extremity of the hose or the inner wall thereof. The abrupt shoulder 20 receives a portion of the hose thereagainst incident to the contraction of the hose when relieved of the pressure of the bead 19 so that the hose is held frictionally upon the nipple and from withdrawal outwardly over the bead 19. When the clincher fingers 14 are bent down into engaging position with the hose 16, as shown in Figure 2, the hose end which surrounds the body of the nipple 11 is compressed and contracted about and against the nipple so that there is a substantial body portion of the hose throughout substantially the length of the nipple behind the retaining shoulder 20. Thus the nipple 11 may be relatively short, as is the conventional form of this type of hose coupling, and the full advantages of the length of the nipple 11 are obtained in securing a firm purchase of the hose end in the coupling.

Figure 3:
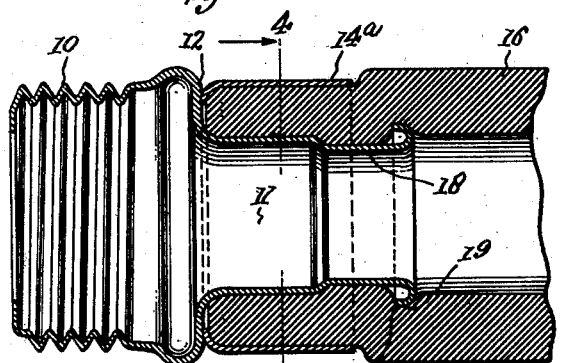
Figure 3 is a view similar to Figure 2, but showing the invention applied to a slightly different type of hose coupling having a contracted ferrule or ring for securing the hose on the nipple.
Figure 4:
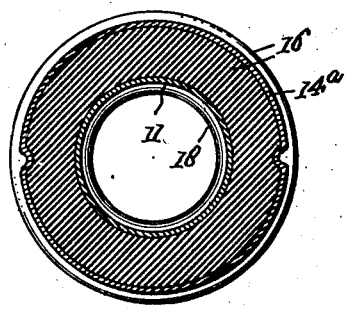
Figure 4 is a transverse section taken through the same on the line 4—4 of Figure 3.

In Figures 3 and 4 the invention is illustrated as applied to a different or modified type of hose coupling. In this construction the securing means, instead of being in the form of fingers 14, comprises a ferrule 14ª which is at present used in some types of couplings and is in the form of a ring or sleeve which is fitted loosely over the end of the hose and after the latter has been applied to the nipple 11 the ferrule or ring 14ª is contracted or reduced in diameter by crimping or the like under suitable pressure to compress the end of the hose 16 about and upon the nipple 11 behind the shoulder 20 of the combined cam and retaining bead 19.

Figure 5:
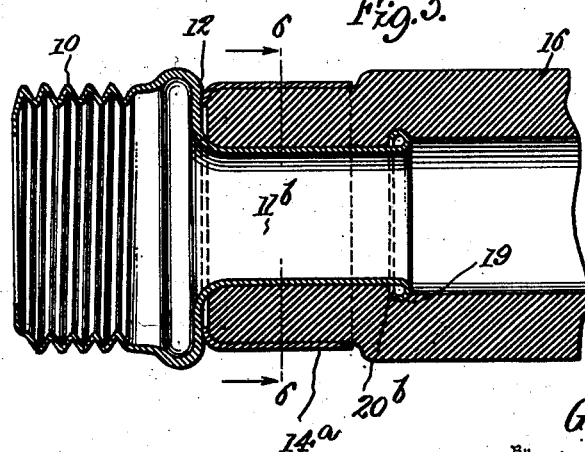
Figure 5 is a longitudinal section taken through the form of the hose coupling shown in Figure 5

The nipple 11 as before stated may have its outer end portion reduced to provide the neck 18, or the entire nipple, as shown at 11ᵇ in Figures 5 and 6, may be reduced to substantially the diameter of the neck 18 throughout the entire length of the nipple 11 so as to provide a greater length of the end of the hose 16 in compressed and reduced position behind the retaining shoulder and thus increase the effectiveness of the coupling against pulling away from the end of the hose. As shown in Figures 5 and 6 the bead 19 on the extremity of the nipple may have its retaining shoulder 20ᵇ slightly rounded by carrying the edge of the bead further toward the nipple as shown in comparing Figures 3 and 5. However, the biting edge of the shoulder 20ᵇ is still present so as to frictionally engage the inner wall of the contracted portion of the hose 16 to offer resistance to the expansion and sliding of the hose end outwardly over the bead 19. In Figure 3 the rear edge of the bead 19, which forms the shoulder 20, also shown in Figure 2, terminates in a plane transverse to the axis of the nipple so that the rear extremity of the turned over bead 19 presents a flat annular face which is directed backwardly of the nipple and thus presents a relatively sharp edge or abutment against which the inner wall of the hose 16 may expand or bulge incident to the contraction of the hose end and the application of the securing means thereabout.

The bead 19 with its shoulder 20 may be easily and economically constructed upon the end of the nipple 11 and without the addition of any separate parts to the coupling, and being upon the nipple 11 operates against the inner wall of the hose 16 so that advantage is taken of the inherent contracting qualities of the hose after it has been expanded over the bead 19. The invention is thus applicable to various types of hose couplings, two of which have been illustrated in the present drawing although other forms and constructions of couplings may be used for the purpose of contracting and binding the hose end upon the nipple 11 inwardly of the bead 19 and retaining shoulder 20.

An essential feature of the invention is to provide the bead 19 with its shoulder 20 on the extremity of the nipple so that the entire length of the relatively short nipple may be used to advantage in supporting a substantial length of the end of the hose 16 in contracted and secured position. It is also essential to have the bead 19 on the extremity of the nipple so that the bead with its rounded outer face may act as a cam which may be forced into the hose end 16 against the inner wall thereof for not only expanding the hose over the bead but to reduce the frictional contact between the bead and the inner wall of the hose and to facilitate the forcing of the hose over the nipple 11 to the full extent thereof.

It is obvious that various changes and modifications may be made in the details of construction and design of the above specifically described embodiment of this invention without departing from the spirit thereof, such changes and modifications being restricted only by the scope of the following claim:

What is claimed is:

A clincher hose coupling, comprising a tubular body of sheet metal having a coupling portion at one end and having a hose receiving nipple at its other end and rolled over outwardly and backwardly at the extremity of the nipple into a bead semicircular in cross section with a rounded cam outer surface for easy passage of a hose end thereover and upon the nipple and with an abrupt rearwardly facing shoulder for engagement in the inner wall of the hose to hold the same on the nipple, and clinching means of less length than that of the nipple for engagement about the hose inwardly of the bead to compress the hose about the nipple and against the shoulder of the bead.

GEORGE G. HOWARD.